US012596747B2

(12) United States Patent
Rozner et al.

(10) Patent No.: US 12,596,747 B2
(45) Date of Patent: Apr. 7, 2026

(54) NATURAL LANGUAGE SEARCH OVER SECURITY VIDEOS

(71) Applicant: TYCO FIRE & SECURITY GMBH, Schaffhausen (CH)

(72) Inventors: Amit Rozner, Yehud (IL); Yohay Falik, Petah Tiqwa (IL); Ran Levy, Rishon Lezion (IL)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 18/814,322

(22) Filed: Aug. 23, 2024

(65) Prior Publication Data

US 2025/0068674 A1     Feb. 27, 2025

Related U.S. Application Data

(60) Provisional application No. 63/578,869, filed on Aug. 25, 2023.

(51) Int. Cl.
G06F 16/73          (2019.01)
(52) U.S. Cl.
CPC .................................... G06F 16/73 (2019.01)
(58) Field of Classification Search
CPC ..... G06F 16/73; G06F 16/7837; G06V 10/82; G06V 20/44; G06V 30/19093
See application file for complete search history.

(56) References Cited

U.S. PATENT DOCUMENTS 10,768,769 B2 * 9/2020 Choe .................... A63F 13/795
10,896,342 B2   1/2021 Gavrilyuk et al.

2019/0147284 A1 * 5/2019 Gavrilyuk ................. G06T 7/73
                                                             382/103
2021/0264227 A1 * 8/2021 Ma ............................ G06T 7/73
2023/0086735 A1 * 3/2023 Yan ....................... G06F 16/738
                                                             382/190
2024/0355100 A1 * 10/2024 Katole ................... G06N 20/10

OTHER PUBLICATIONS

Tellex et al., "Towards Surveillance Video Search by Natural Language Query", Copyright 2009 ACM 978-1-60558-480-5/09/07 (Year: 2009).*
Erozel et al., "Natural language querying for video databases", Information Sciences 178 (2008) 2534-2552 (Year: 2008).*
Hakeem et al., "Semantic Video Search using Natural Language Queries", Copyright 2009 ACM 978-1-60558-608-3/09/10 (Year: 2009).*

* cited by examiner

*Primary Examiner* — Jared M Bibbee
(74) *Attorney, Agent, or Firm* — ArentFox Schiff LLP

(57)          ABSTRACT

A system may be configured to provide natural language search over security videos. In some aspects, the system may generate a first representation of sampled video information in a multidimensional format via a first machine learning model, and receive a request including a natural language input. Further, the system may generate a second representation of the natural language input in the multidimensional format via a second machine learning model that is a different from the first machine learning model, and determine that the first representation has a predefined relationship with the second representation. In addition, the system may present the second representation as a response to the request based on the first representation having the predefined relationship with the second representation.

17 Claims, 7 Drawing Sheets

300

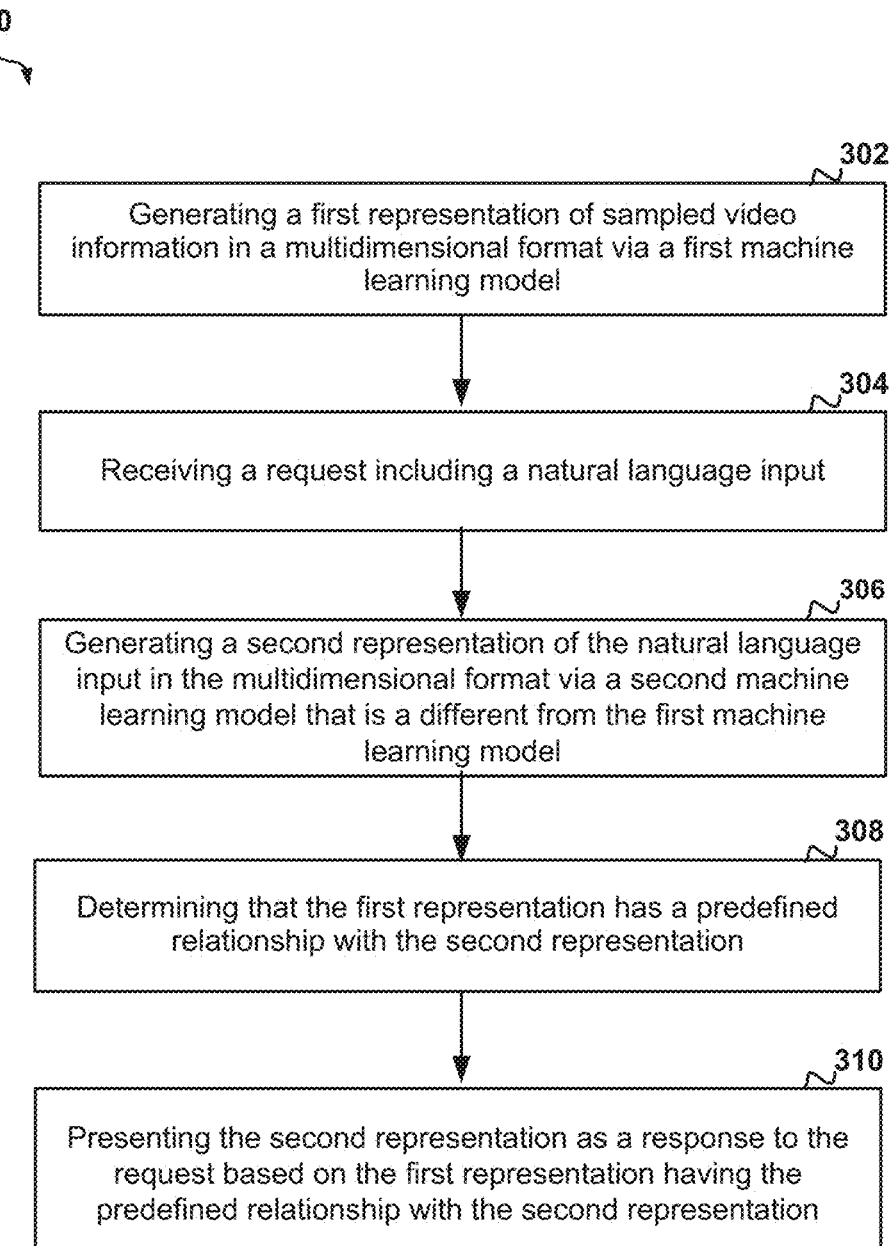

302

Generating a first representation of sampled video information in a multidimensional format via a first machine learning model

304

Receiving a request including a natural language input

306

Generating a second representation of the natural language input in the multidimensional format via a second machine learning model that is a different from the first machine learning model

308

Determining that the first representation has a predefined relationship with the second representation

310

Presenting the second representation as a response to the request based on the first representation having the predefined relationship with the second representation

Figure 4:
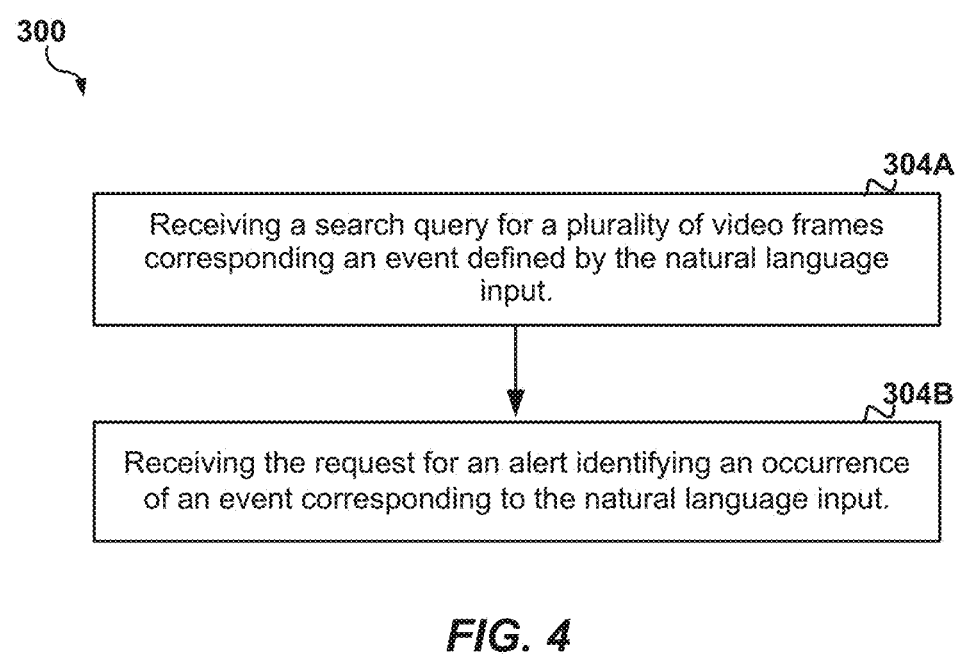

Receiving a search query for a plurality of video frames corresponding an event defined by the natural language input.

304B

Receiving the request for an alert identifying an occurrence of an event corresponding to the natural language input.

Determining that the first representation has a predefined similarity to the second representation.

304

Determining that the first representation is within a predefined distance of the second representation within the multidimensional format.

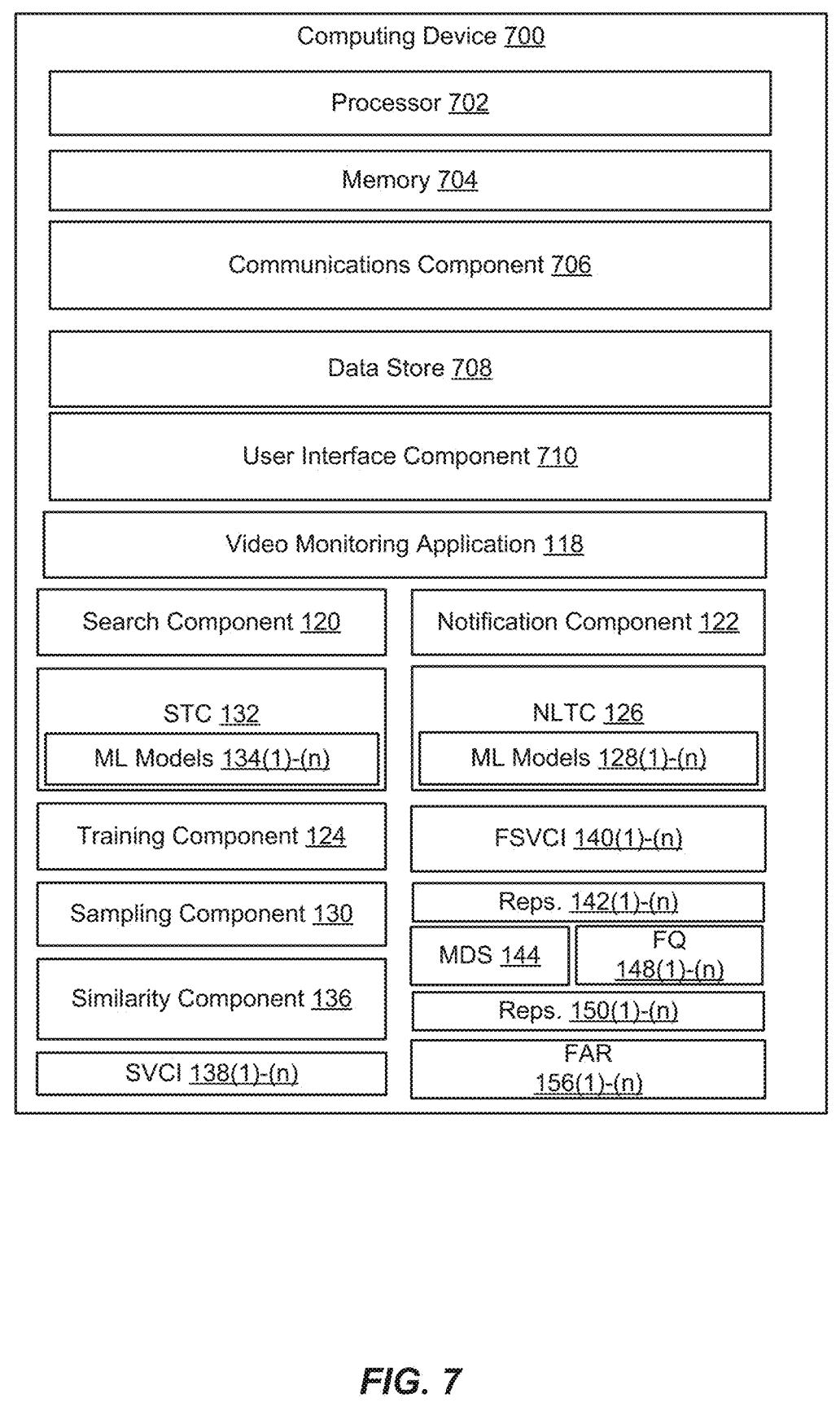

Computing Device 700

Processor 702

Memory 704

Communications Component 706

Data Store 708

User Interface Component 710

Video Monitoring Application 118

Search Component 120

Notification Component 122

STC 132

ML Models 134(1)-(n)

NLTC 126

ML Models 128(1)-(n)

Training Component 124

FSVCI 140(1)-(n)

Sampling Component 130

Reps. 142(1)-(n)

MDS 144

FQ 148(1)-(n)

Similarity Component 136

Reps. 150(1)-(n)

SVCI 138(1)-(n)

FAR 156(1)-(n)

*FIG. 7*

NATURAL LANGUAGE SEARCH OVER SECURITY VIDEOS

RELATED APPLICATIONS

This application claims priority to U.S. Provisional Patent Application Ser. No. 63/578,869, filed on Aug. 25, 2023, the entire disclosure of which is incorporated by reference herein.

BACKGROUND

In some monitored areas (e.g., buildings), operators may employ a monitoring system to detect different types of events occurring within and/or around the monitored area (e.g., unauthorized access to a room, a medical emergency, a building fire, a building flood, crime (e.g., theft, violence, etc.) within the monitored area). For example, an operator may install video cameras throughout a monitored area for monitoring the movement of people within the monitored area. However, it may be difficult, inefficient, and/or cumbersome to search for and/or identify events that have occurred within the video information captured by the video cameras due to the large amounts of video information collected and/or input limitations when describing video information of interest.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a method including: generating a first representation of sampled video information in a multidimensional format via a first machine learning model; receiving a request including a natural language input; generating a second representation of the natural language input in the multidimensional format via a second machine learning model that is different from the first machine learning model; determining that the first representation has a predefined relationship with the second representation; and presenting the second representation as a response to the request based on the first representation having the predefined relationship with the second representation.

The present disclosure includes a system having devices, components, and modules corresponding to the steps of the described methods, and a computer-readable medium (e.g., a non-transitory computer-readable medium) having instructions executable by a processor to perform the described methods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIGS. 3-6 are flow diagrams of an example of a method of natural language search over security videos, according to some implementations.

FIG. 7 is block diagram of an example of a computer device configured to implement a system for providing natural language search over security videos, according to some implementations.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Implementations of the present disclosure provide natural language search over security videos. In some implementations, one problem solved by the present solution is event identification in video recordings, which can be difficult to solve with other approaches. For example, the present disclosure describes systems and methods that establish a connection between natural language input and recorded video by mapping natural language prompts to video recording frames in a common multidimensional plane where both natural language inputs and images are assigned specific coordinates/vectors by separate machine learning models. Further, the present solution leverages the multidimensional space to provide a user-friendly means for describing video information of interest and improved search/detection accuracy and machine learning (ML) model training efficiency over conventional techniques.

Figure 1:
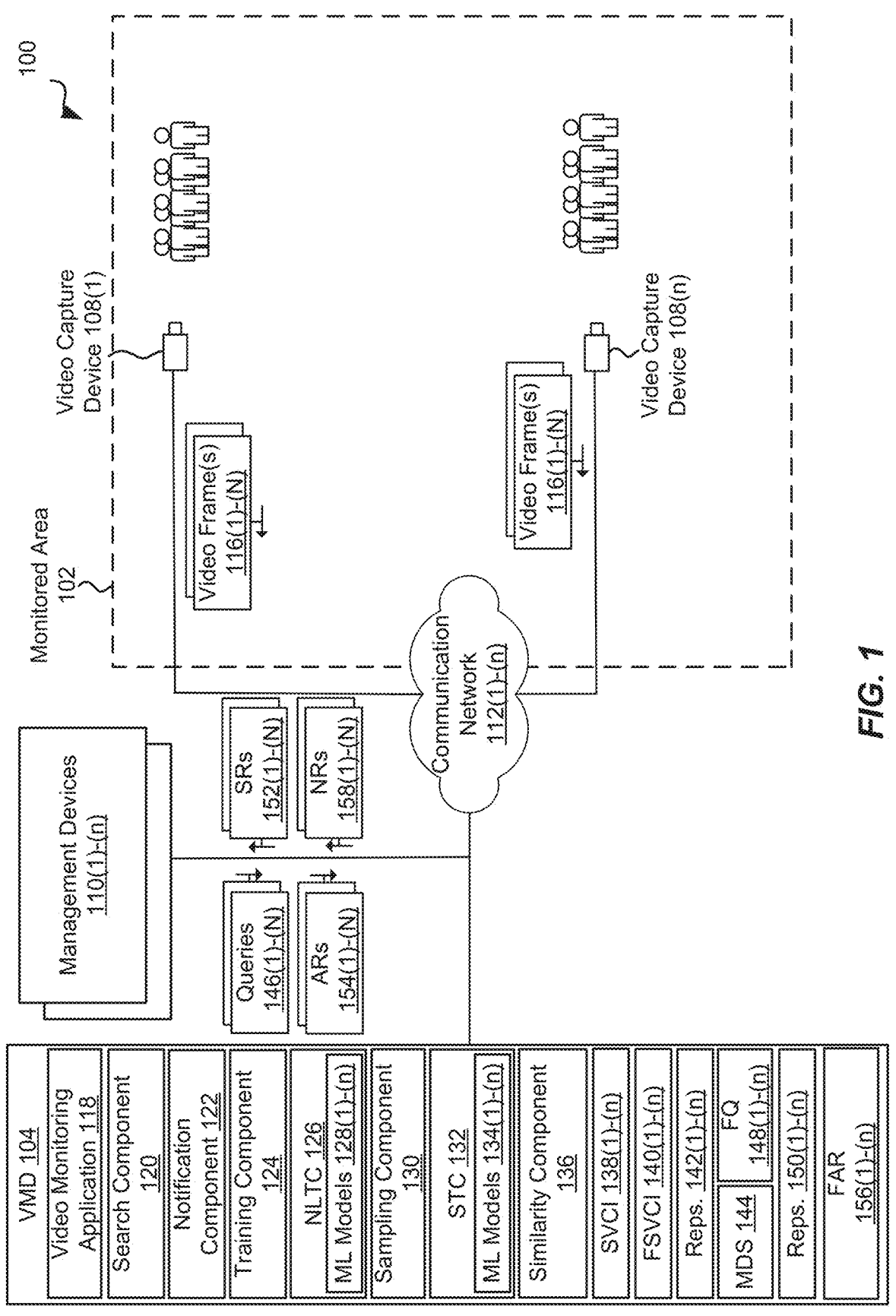
FIG. 1 is a block diagram a system for providing natural language search over security videos, according to some implementations.

Referring to FIG. 1, in one non-limiting aspect, an event monitoring system 100 is configured to monitor activity within and/or around a monitored area 102, and identify video capture device incidents. For example, event monitoring system 100 is configured to capture video feed data, and analyze the video feed data as displayed on a display device to detect video capture device incidents.

As illustrated in FIG. 1, the event monitoring system 100 may include a video monitoring device (VMD) 104, one or more video capture devices 108(1)-(n) (e.g., a video camera), one or more management devices 110(1)-(n), and/or one or more communication networks 112(1)-(n). Further, the one or more video capture device 108(1)-(n) may be positioned in different areas of the monitored area 102. In some implementations, a communication network 112 may include a plain old telephone system (POTS), a radio network, a cellular network, an electrical power line communication system, one or more of a wired and/or wireless private network, personal area network, local area network, wide area network, and/or the Internet. Further, in some aspects, the video monitoring device 104, the one or more video capture devices 108(1)-(n), and the one or more management devices 110(1)-(n) may be configured to communicate via the communication networks 112(1)-(n).

In some aspects, the video capture devices 108(1)-(n) may capture one or more video frames 116(1)-(n) of activity within the monitored area 102, and transmit the one or more video frames 116(1)-(n) to the video monitoring device 104 via the communications network 112(1)-(n). Some examples of the management devices 110(1)-(n) include smartphones, computing devices, Internet of Things (IoT) devices, video game systems, robots, process automation equipment, control devices, vehicles, transportation equipment, and virtual and augmented reality (VR and AR) devices.

The video monitoring device 104 may be configured to receive the one or more video frames 116(1)-(n) from the video capture devices 108(1)-(n), and present a monitoring interface (e.g., a graphical user interface) for viewing of the one or more video frames 116(1)-(n) on the video monitoring device 104 and/or the one or more management devices 110(1)-(n). As illustrated in FIG. 1, the video monitoring device 104 may include a video monitoring application 118 for presenting a monitoring interface for viewing the one or more video frames 116(1)-(n). In some aspects, the video monitoring application 118 may present a live stream including the one or more frames 116 or present playback of previously-captured video frames 116(1)-(n). For example, security and/or other personnel may monitor activity within the monitored area 102 by viewing the one or more frames 116 as presented by the video monitoring application 118. In some examples, the monitoring interface may provide playback controls for managing the viewing experience. Some examples of playback controls include zoom in/zoom out the one or more frames 116, speed up/down playback of the one or more frames 116, increase/decrease volume, fast-forward or rewind playback of the one or more frames 116, or play/pause/end playback of the one or more frames 116.

The video monitoring device 104 further includes a search component 120, a notification component 122, a training component 124, a natural language (NL) translation component (NLTC) 126 including one or more ML models 128(1)-(n), a sampling component 130, a sample translation component (STC) 132 including one or more ML models 134(1)-(n), and a similarity component 136.

As the video monitoring device 104 receives the one or more video frames 116(1)-(n) from the one or more video capture devices 108(1)-(n), the sampling component 130 periodically samples the one or more video frames 116(1)-(n) as sampled video capture information (SVCI) 138(1)-(n). In some aspects, the sampling component 130 performs one or more formatting and/or normalization processes on the SVCI 138(1)-(n) to generate formatted sampled video capture information 140(1)-(n). For example, the sampling component 130 performs a formatting/normalization process on a first plurality of video frames 116 to generate a first formatted sampled video capture information 140(1), a formatting/normalization process on a nth plurality of video frames 116 to generate a nth formatted sampled video capture information 140(1), and so forth. Some examples of formatting and/or normalization processes include applying a resolution formatting method, applying a light correction method, applying a shadow effect filter, or applying a histogram equalization.

In some examples, the sampling component 130 may perform object detection and object tracking processes over the plurality of video frames 116(1)-(n) to generate tracking information and determine when to sample the plurality of video frames 116(1)-(n) to generate the sampled video capture information 138(1)-(n) based at least in part on the tracking information. For instance, in some aspects, the sampling component 130 may perform multi-object tracking of objects within the plurality of video frames 116(1)-(n) via an object detector and object tracker to determine whether to sample one or more contents of a video frame 116 as the sampled video capture information 138(1)-(n). In some aspects, the sampling component 130 may determine the frequency of sample generation based upon the tracking information indicating at least one of detection of a new object, disappearance of an object, movement of an object, reappearance of an object, potential occlusion of an object, and/or inactivity of an object. For example, the sampling component 130 may reduce the frequency of sample generation based on inactivity by one or more objects detected within the plurality of video frames 116 and/or disappearance of an object. As another example, the sampling component 130 may increase the frequency of sample generation based on detection of one or more new objects within the plurality of video frames 116 and/or reappearance of an object.

In some aspects, the sample translation component 132 generates representations 142(1)-(n) of the sampled video capture information 138(1)-(n) via the one or more ML models 134(1)-(n). For example, the sample translation component 132 generates a first representation 142(1) of the first sampled video capture information 138(1), a nth representation 142(n) of the nth sampled video capture information 138(n), and so forth. In some other aspects, the sample translation component 132 generates the representation of the formatted sampled video capture information 140(1)-(n) via the one or more ML models 134(1)-(n). For example, the sample translation component 132 generates a first representation 142(1) of the first formatted sampled video capture information 140(1), a nth representation 142(n) of the nth formatted sampled video capture information 140(n), and so forth. The representations 142(1)-(n) belong to a multi-dimensional space 144 and includes a plurality of coordinates used to map the sampled video information 138(1)-(n) and formatted sampled video information 140(1)-(n) to the multi-dimensional space 144. In some aspects, the coordinates of the multi-dimensional space 144 correspond to the features of the one or more ML models 128(1)-(n) and/or the one or more ML models 134(1)-(n). For example, a first set of coordinates can correspond to a first feature of the one or more ML models 128(1)-(n) and a second set of coordinates can correspond to a second feature of the one or more ML models 128(1)-(n), and so on. Exemplary ML model features can include, but are not limited to: vectors of any size produced by the corresponding models.

The search component 120 receives queries 146(1)-(n) as natural language (NL) input via a user interface (e.g., a graphical user interface (GUI)) and searches the one or more video frames 116(1)-(n) received from the one or more video capture devices 108(1)-(n) for a plurality of video frames 116 corresponding to the queries 146(1)-(n). In some aspects, the search component 120 performs one or more formatting and/or normalization processes on the queries 146(1)-(n) to generate formatted queries (FQ) 148(1)-(n). Some examples of formatting and/or normalization processes include typographical error correction, modifications to the case of the letters of query 146, and replacement of particular terms within the query 146 with preferred terms (e.g., using one or more thesauruses).

Further, in some aspects, the NL translation component 126 generates representations 150(1)-(n) of the queries 146(1)-(n) via the one or more ML models 128(1)-(n). For example, the NL translation component 126 generates a first representation 150(1) of the first query 146(1), a nth representation 150(n) of the nth query 146(n), and so forth. In some other aspects, the NL translation component 126 generates representations 150(1)-(n) of the formatted queries 148(1)-(n) via the one or more ML models 128(1)-(n). For example, the NL translation component 126 generates a first representation 150(1) of the first formatted query 148 (1), a nth representation 150(n) of the nth formatted query 148(n), and so forth. The representations 150(1)-(n) belong to the multi-dimensional space (MDS) 144 and each includes a plurality of coordinates used to map a particular query 146 to the multi-dimensional space 144. In an aspect, different sets of coordinates correspond to different sample queries.

The similarity component 136 receives the representations 150(1)-(n) of the queries 146(1)-(n) and/or the formatted queries 148(1)-(n), and compares the representations 150(1)-(n) to representations 142(1)-(n) of the sampled video capture information 138(1)-(n) and the formatted sampled video capture information 140(1)-(n). For example, the similarity component 136 identifies one or more sampled video capture information 138(1)-(n) and/or formatted sampled video capture information 140(1)-(n) corresponding to a representation 142 having a predefined similarity to the representation 150(1). In some aspects, the similarity component 136 identifies the one or more the sampled video capture information 138(1)-(n) and/or the formatted sampled video capture information 140(1)-(n) having a predefined similarity to the representation 150(1) based on the distance between the representation 150(1) and the representations 142(1)-(n) corresponding to the one or more sampled video capture information 138(1)-(n) and/or formatted sampled video capture information 140(1)-(n) being less than a predefined value or having a predefined ranking in comparison to other representations 142. For example, the similarity component 136 may employ the k-nearest neighbors' algorithm, which uses proximity to make classifications or predictions about the grouping of an individual data point. Once the similarity component 136 identifies the one or more sampled video capture information 138(1)-(n) and/ or the formatted sampled video capture information 140(1)- (n), the search component 120 provides search results 152 (1)-(n) identifying the one or more sampled video capture information 138(1)-(n) and/or the formatted sampled video capture information 140(1)-(n) corresponding to representations 142 identified as having a predefined similarity. In some aspects, each search result 152 identifies video capture information corresponding to a sampled video capture information 138 or formatted sampled video capture information 140 corresponding to a representation 142 identified as having a predefined similarity. For example, a search result 152 for a sampled video capture information 128 may identify one or more video frames 116 preceding the sampled video capture information having the predefined similarity, one or more video frames 116 of the sampled video capture information 138 having the predefined similarity, and one or more video frames 116 succeeding the sampled video capture information 138 having the predefined similarity. Further, the search result 152 may be used to reproduce the corresponding video frames 116 via the video monitoring application 118.

The notification component 122 receives alert requests (AR) 154(1)-(n) as NL input via a user interface (e.g., a GUI) and monitors the one or more video frames 116(1)-(n) received from the one or more video capture devices 108 (1)-(n) for plurality of video frames corresponding to the alert requests 154(1)-(n). In some aspects, the notification component 122 performs one or more formatting and/or normalization processes on the alert requests 154(1)-(n) to generate a formatted alert requests (FAR) 156(1)-(n). Some examples of formatting and/or normalization processes include typographical error correction, modifications to the case of the letters of NL prompt, and replacement of particular terms within the NL prompt with preferred terms (e.g., using one or more thesauruses).

Further, in some aspects, the NL translation component 126 generates representations 150(1)-(n) of the alert requests 154(1)-(n) via the one or more ML models 128(1)-(n). For example, the NL translation component 126 generates a first representation 150(1) of the first alert request 154(1), a nth representation 150(n) of the nth alert request 154(n), and so forth. In some other aspects, the NL translation component 126 generates representations 150(1)-(n) of the formatted alert requests 156(1)-(n) via the one or more ML models 128(1)-(n). For example, the NL translation component 126 generates a first representation 150(1) of the first formatted alert request 156(1), a nth representation 150(n) of the nth formatted alert request 156(n), and so forth. The representations 150(1)-(n) belong to the multi-dimensional space 144 and each includes a plurality of coordinates used to map a particular alert request 154 to the multi-dimensional space 144.

The similarity component 136 receives the representations 150(1)-(n) of the alert requests 154(1)-(n) and/or the formatted alert requests 156(1)-(n), and compares the representations 150(1)-(n) to representations 142(1)-(n) of the sampled video capture information 138(1)-(n) and the formatted sampled video capture information 140(1)-(n). For example, the similarity component 136 identifies one or more sampled video capture information 138(1)-(n) and/or formatted sampled video capture information 140(1)-(n) corresponding to a representation 142 having a predefined similarity to the representation 150(1). In some aspects, the similarity component 136 identifies the one or more the sampled video capture information 138(1)-(n) and/or the formatted sampled video capture information 140(1)-(n) having a predefined similarity to the representation 150(1) based on the distance between the representation 150(1) and the representations 142(1)-(n) corresponding to the one or more sampled video capture information 138(1)-(n) and/or formatted sampled video capture information 140(1)-(n) being less than a predefined value or having a predefined ranking in comparison to other representations 142. For example, the similarity component 136 may employ the k-nearest neighbor algorithm, which uses proximity to make classifications or predictions about the grouping of an individual data point. Once the similarity component 136 identifies the one or more sampled video capture information 138(1)-(n) and/or the formatted sampled video capture information 140(1)-(n) having a predefined similarity, the notification component 122 provides notification results (NR) 158(1)-(n) corresponding to the sampled video capture information 138(1)-(n) and/or the formatted sampled video capture information 140(1)-(n) having a predefined similarity. In some aspects, each notification result 158 identifies video capture information corresponding to a sampled video capture information 138 or formatted sampled video capture information 140 corresponding to representations 142 identified as having a predefined similarity. For example, a notification result 158 for a sampled video capture information 128 may identify one or more video frames 116 preceding the sampled video capture information having the predefined similarity, one or more video frames 116 of the sampled video capture information 138 having the predefined similarity, and one or more video frames 116 succeeding the sampled video capture information 138 having the predefined similarity. Further, the notification result 158 may be used to reproduce the corresponding video frames 116 via the video monitoring application 118.

In some examples, the search component 120 receives a query 146 from a management device 110, and transmits the corresponding search result 152 to the management device 110 for viewing by monitoring personnel via a remote video monitoring application. Additionally, or alternatively, in some examples, the notification component 122 receives an alert request 154 from a management device 110, and transmits the notification result 158 to the management device 110 for viewing by monitoring personnel via a remote video monitoring application.

Additionally, the training component 124 trains the one or more ML models 128(1)-(n) of the NL translation component 126 and the one or more ML models 134(1)-(n) of the sample translation component 132. In some examples, the one or more ML models 128(1)-(n) of the NL translation component 126 and the one or more ML models 134(1)-(n) of the sample translation component 132 may be transformer models, autoencoders, or recurrent neural networks (RNN). In some examples, the one or more ML models 134(1)-(n) of the sample translation component 132 may be deep learning models (e.g., neural network, convolutional neural networks, RNNs, etc.). In some aspects, the training component 124 jointly trains the one or more ML models 128(1)-(n) and the one or more ML models 134(1)-(n) using a common process to generate corresponding representations for pairings of image to NL text within the multidimensional space 144. For example, in some aspects, the training component 124 receives image-text pairs (e.g., an image and corresponding caption), transforms the images to representations using the model 134 and the captions to representations of the same length using the model 128. Further, the training component 124 may perform normalization, pull the corresponding representations closer (e.g., adjust the models to reduce the distance between corresponding representations within the multidimensional space), and push apart the non-corresponding vectors (e.g., adjust the models to increase the distance between non-corresponding representations within the multidimensional space). In some aspects, the training component 124 employs contrastive pre-training to generate the one or more ML models 128(1)-(n) and the one or more ML models 134(1)-(n). Further, in some aspects, the training technique of the training component 124 provides zero-shot learning capabilities, which trains the one or more ML models 128(1)-(n) and the one or more ML models 134(1)-(n) to make predictions for images that were not observed during training.

Figure 2:
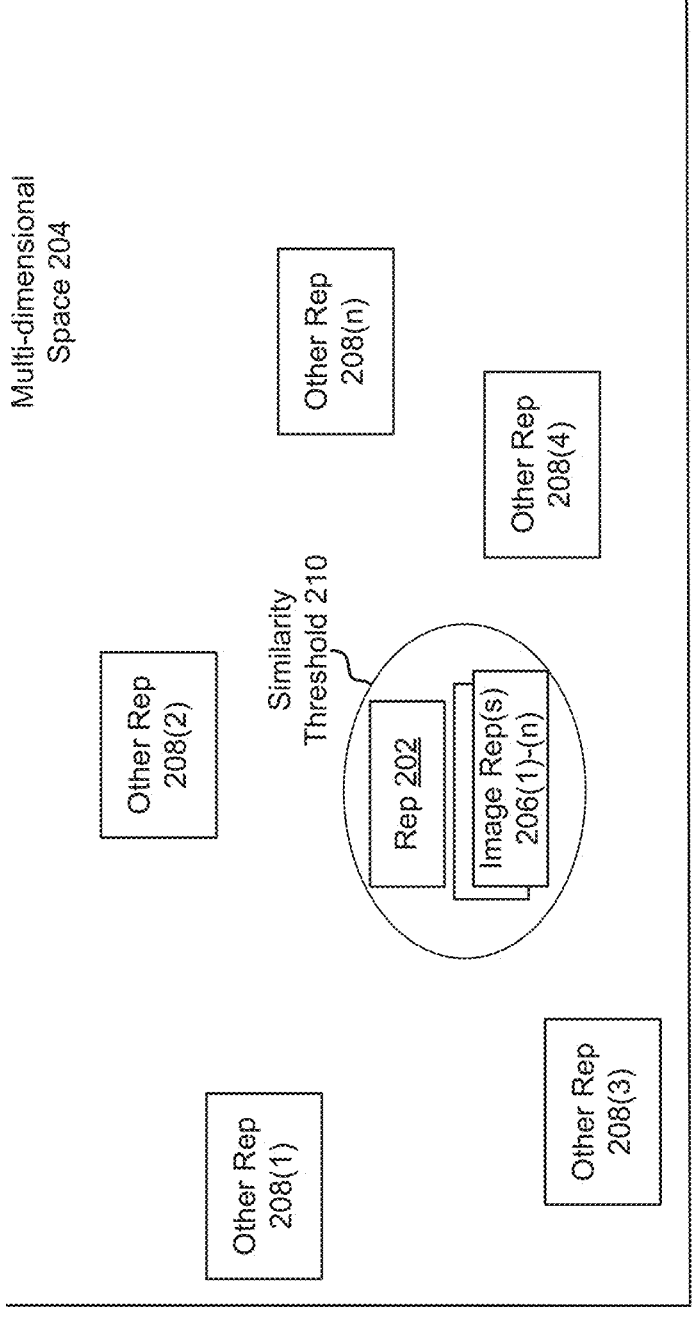
FIG. 2 is an example of a multi-dimensional space for providing natural language search over security videos, according to some implementations.

FIG. 2 is an example of a multidimensional space including a plurality of representations, according to some implementations. As illustrated in FIG. 2, a representation 202 of NL input (e.g., a query or alert request) may be generated within a multidimensional space 204. Further, a similarity component (e.g., the similarity component 136) may identify one or representations 206(1)-(n) of sampled video capture information (e.g., sampled video capture information 138) having a predefined similarity to the representation

202 and one or more other representations 208(1)-(n) of sampled video capture information (e.g., sampled video capture information 138) that do not have the predefined similarity to the representation 202. In some aspects, the similarity component identifies the representations 206(1)-(n) based upon the distance of the representations 208(1)-(n) from the representation 202 being within or less than a similarity threshold 210 (e.g., a predefined distance and/or grouping).

Referring to FIG. 3, in operation, the video monitoring device 104 or computing device 400 may perform an example method 300 for providing natural language search over security videos. The method 300 may be performed by one or more components of the video monitoring device 104, the computing device 400, or any device/component described herein according to the techniques described with reference to FIGS. 1-2 and 4.

At block 302, the method 300 includes generating a first representation of sampled video information in a multidimensional format via a first machine learning model. For example, the sample translation component 132 generates a first representation 142(1) of the first sampled video capture information 138(1) or the formatted sampled video capture information 140(1). Accordingly, the video monitoring device 104, the computing device 400, and/or the processor 402 executing the sample translation component 132 may provide means for receiving a request including natural language input.

At block 304, the method 300 includes receiving a request including natural language input. For example, the search component 120 receives a query 146(1) or an alert request 154(1) as NL input via a GUI. Accordingly, the video monitoring device 104, the computing device 400, and/or the processor 402 executing the search component 120 or the notification component 122 may provide means for receiving a request including natural language input.

At block 306, the method 300 includes generating a second representation of natural language input in the multidimensional format via a second machine learning model that is a different from the first machine learning model. For example, the NL translation component 126 generates a representation 150(1) of the query 146(1) or the alert request 154(1) via the model 128(1). Accordingly, the video monitoring device 104, the computing device 400, and/or the processor 402 executing the NL translation component 126 may provide means for generating a second representation of natural language input in the multidimensional format via a second machine learning model that is a different from the first machine learning model. Exemplary ways in which the machine learning models differ include, but are not limited to, Clip, which includes two models (vision and text) trained jointly. Another example is using two different models (one for vision and one for text), where their features are adapted using an adapter component.

At block 308, the method 300 includes determining that the first representation has a predefined relationship with the second representation. For example, the similarity component 136 identifies a representation 142(1) having a predefined similarity to the representation 150(1) based on the distance between the representation 150(1) and the representation 142(1) being less than a predefined value. Further, the representation 142(1) may correspond to the sampled video capture information 138(1) or the formatted sampled video capture information 140(1). Accordingly, the video monitoring device 104, the computing device 400, and/or the processor 402 executing the similarity component 136 may provide means for determining that the first representation has a predefined relationship with the second representation.

At block 310, the method 300 includes presenting the second representation as a response to the request based on the first representation having the predefined relationship with the second representation. For example, transmitting a search result 152(1) or a notification result 158(1) including an identifier of the sampled video capture information 138(1) or the formatted sampled video capture information 140(1). In some aspects, the search result 152(1) or the notification result 158(1) may include timestamps corresponding to one or more video frames 116 preceding the sampled video capture information 138(1), the one or more video frames 116 of the sampled video capture information 138(1), and one or more video frames 116 succeeding the sampled video capture information 138(1). Additionally, or alternatively, in some aspects, the search result 152(1) or the notification result 158(1) may include one or more video frames 116 preceding the sampled video capture information 138(1), one or more video frames 116 of the sampled video capture information 138(1), and one or more video frames 116 succeeding the sampled video capture information 138 (1). Accordingly, the video monitoring device 104, the computing device 400, and/or the processor 402 executing the search component 120 or the notification component 122 may provide means for presenting the second representation as a response to the request based on the first representation having the predefined relationship with the second representation.

Referring to FIG. 4, further sub-blocks of block 304 of method 300 of FIG. 3 are shown.

At block 304A, the method 300 includes receiving a search query for a plurality of video frames corresponding an event defined by the natural language input.

At block 304B, the method 300 includes receiving the request for an alert identifying an occurrence of an event corresponding to the natural language input.

Figure 5:
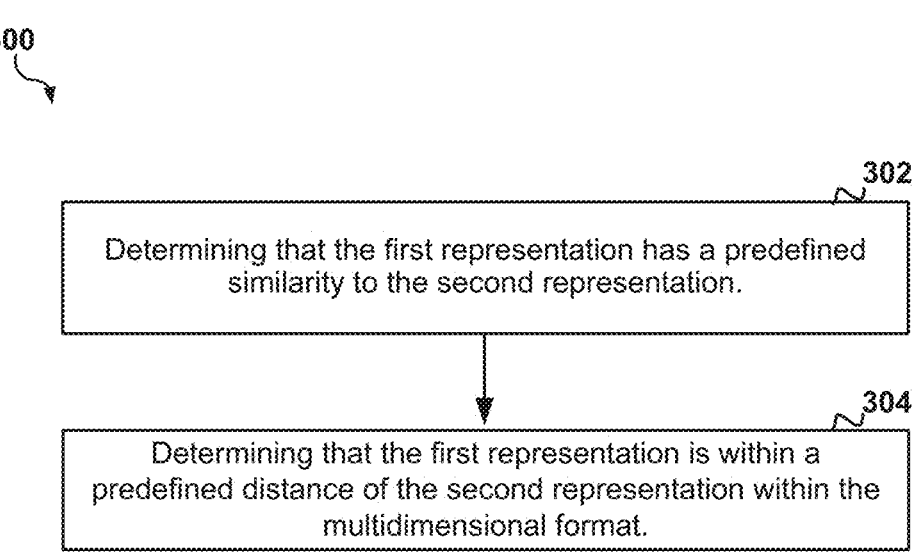

Referring to FIG. 5, further sub blocks of block 308 of method 300 of FIG. 3 are shown.

At block 308A, the method 300 includes determining that the first representation has a predefined similarity to the second representation.

At block 308B, the method 300 includes determining that the first representation is within a predefined distance of the second representation within the multidimensional format.

Figure 6:
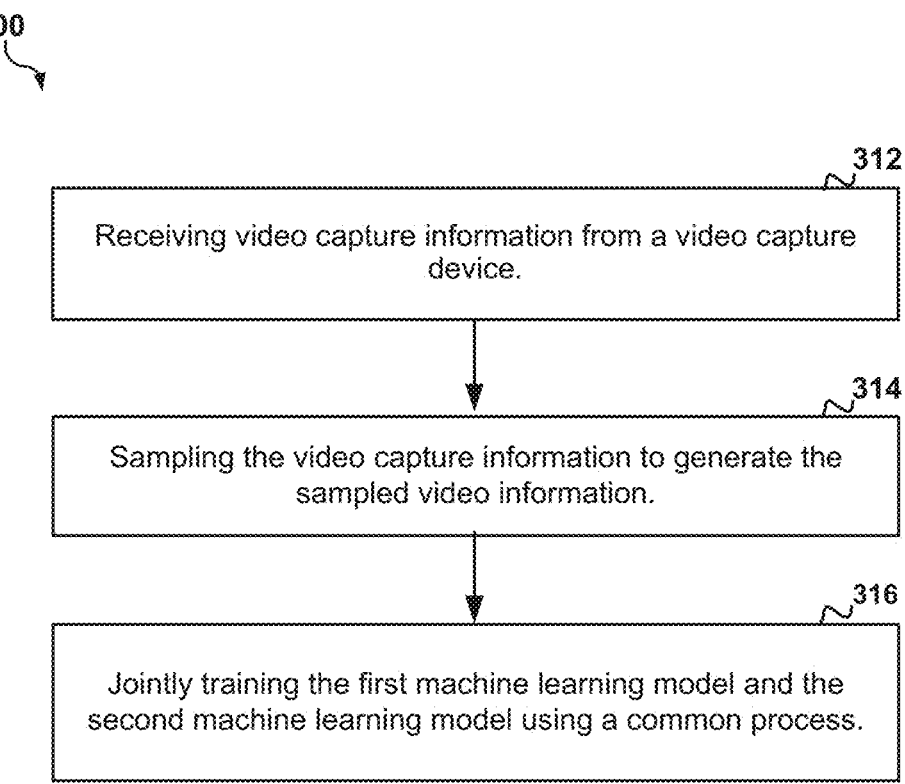

Referring to FIG. 6, further blocks of method 300 of FIG. 3 are shown.

At block 312, the method 300 includes receiving video capture information from a video capture device.

At block 314, the method 300 includes sampling the video capture information to generate the sampled video information.

At block 316, the method 300 includes jointly training the first machine learning model and the second machine learning model using a common process.

Referring to FIG. 7, a computing device 700 may implement all or a portion of the functionality described herein. The computing device 700 may be or may include or may be configured to implement the functionality of at least a portion of the event monitoring system 100, or any component therein. For example, the computing device 700 may be or may include or may be configured to implement the search component 120, the notification component 122, the training component 124, the NL translation component 126, the one or more ML models 128(1)-(n), the sampling component 130, the sample translation component 132, the one or more ML models 134(1)-(n), and the similarity component 136. The computing device 700 includes a processor 702 which may be configured to execute or implement software, hardware, and/or firmware modules that perform any functionality described herein. For example, the processor 702 may be configured to execute or implement software, hardware, and/or firmware modules that perform any functionality described herein with reference to the search component 120, the notification component 122, the training component 124, the NL translation component 126, the one or more ML models 128(1)-(n), the sampling component 130, the sample translation component 132, the one or more ML models 134(1)-(n), and the similarity component 136, or any other component/system/device described herein.

The processor 702 may be a micro-controller, an application-specific integrated circuit (ASIC), a digital signal processor (DSP), or a field-programmable gate array (FPGA), and/or may include a single or multiple set of processors or multi-core processors. Moreover, the processor 702 may be implemented as an integrated processing system and/or a distributed processing system. The computing device 700 may further include a memory 704, such as for storing local versions of applications being executed by the processor 702, related instructions, parameters, etc. The memory 704 may include a type of memory usable by a computer, such as random access memory (RAM), read only memory (ROM), tapes, magnetic discs, optical discs, volatile memory, non-volatile memory, and any combination thereof. Additionally, the processor 702 and the memory 704 may include and execute an operating system executing on the processor 702, one or more applications, display drivers, etc., and/or other components of the computing device 700.

Further, the computing device 700 may include a communications component 706 that provides for establishing and maintaining communications with one or more other devices, parties, entities, etc. utilizing hardware, software, and services. The communications component 706 may carry communications between components on the computing device 700, as well as between the computing device 700 and external devices, such as devices located across a communications network and/or devices serially or locally connected to the computing device 700. In an aspect, for example, the communications component 706 may include one or more buses, and may further include transmit chain components and receive chain components associated with a wireless or wired transmitter and receiver, respectively, operable for interfacing with external devices.

Additionally, the computing device 700 may include a data store 708, which can be any suitable combination of hardware and/or software, that provides for mass storage of information, databases, and programs. For example, the data store 708 may be or may include a data repository for applications and/or related parameters not currently being executed by processor 702. In addition, the data store 708 may be a data repository for an operating system, application, display driver, etc., executing on the processor 702, and/or one or more other components of the computing device 700.

The computing device 700 may also include a user interface component 710 operable to receive inputs from a user of the computing device 700 and further operable to generate outputs for presentation to the user (e.g., via a display interface to a display device). The user interface component 710 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 710 may include one or more output devices, including but not limited to a display interface, a speaker, a haptic feedback mechanism, a printer, any other mechanism capable of presenting an output to a user, or any combination thereof.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method, comprising:
   generating a first representation of sampled video information in a multidimensional format via a first machine learning model;
   receiving a request including a natural language input;
   generating a second representation of the natural language input in the multidimensional format via a second machine learning model that is a different from the first machine learning model;
   determining that the first representation has a predefined relationship with the second representation based on a learned proximity metric between the first representation and the second representation in the multidimensional format; and
   presenting the second representation as a response to the request based on the first representation having the predefined relationship with the second representation.

2. The method of claim 1, wherein receiving the request includes receiving a search query for a plurality of video frames corresponding to an event defined by the natural language input.

3. The method of claim 1, wherein receiving the request includes receiving the request for an alert identifying an occurrence of an event corresponding to the natural language input.

4. The method of claim 1, further comprising:
   receiving video capture information from a video capture device; and
   sampling the video capture information to generate the sampled video information.

5. The method of claim 1, wherein at least one of the first machine learning model and the second machine learning model is a transformer model.

6. The method of claim 1, wherein the first machine learning model is a convolutional neural network.

7. The method of claim 1, further comprising jointly training the first machine learning model and the second machine learning model using a common process.

8. A system comprising:
   at least one memory storing instructions thereon; and
   at least one processor coupled to the at least one memory and configured by the instructions to:
   generate a first representation of sampled video information in a multidimensional format via a first machine learning model;
   receive a request including a natural language input;
   generate a second representation of the natural language input in the multidimensional format via a second machine learning model that is a different from the first machine learning model;
   determine that the first representation has a predefined relationship with the second representation based on a learned proximity metric between the first representation and the second representation in the multidimensional format; and
   present the second representation as a response to the request based on the first representation having the predefined relationship with the second representation.

9. The system of claim 8, wherein the at least one processor is further configured by the instructions to receive a search query for a plurality of video frames corresponding an event defined by the natural language input.

10. The system of claim 8, wherein the at least one processor is further configured by the instructions to receive the request for an alert identifying an occurrence of an event corresponding to the natural language input.

11. The system of claim 8, wherein the at least one processor is further configured by the instructions to receive video capture information from a video capture device, and sample the video capture information to generate the sampled video information.

12. The system of claim 8, wherein at least one of the first machine learning model and the second machine learning model is a transformer model.

13. The system of claim 8, wherein the first machine learning model is a convolutional neural network.

14. A non-transitory computer-readable device having instructions thereon that, when executed by at least one computing device, causes the at least one computing device to perform operations comprising:

generating a first representation of sampled video information in a multidimensional format via a first machine learning model;

receiving a request including a natural language input;

generating a second representation of the natural language input in the multidimensional format via a second machine learning model that is a different from the first machine learning model;

determining that the first representation has a predefined relationship with the second representation based on a learned proximity metric between the first representation and the second representation in the multidimensional format; and presenting the second representation as a response to the request based on the first representation having the predefined relationship with the second representation.

15. The non-transitory computer-readable device of claim 14, wherein receiving the request includes receiving a search query for a plurality of video frames corresponding to an event defined by the natural language input.

16. The non-transitory computer-readable device of claim 14, wherein receiving the request includes receiving the request for an alert identifying an occurrence of an event corresponding to the natural language input.

17. The method of claim 7, wherein the common process comprises coordinated training to align the first representation and the second representation.

\* \* \* \* \*